(12) United States Patent
Thyagarajan et al.

(10) Patent No.: US 12,606,469 B2
(45) Date of Patent: Apr. 21, 2026

(54) SYSTEM AND METHOD FOR MODIFYING pH IN AN AQUEOUS ENVIRONMENT

(71) Applicant: Genesee Valley Innovations, LLC, Santa Clara, CA (US)

(72) Inventors: Krishnan Thyagarajan, Mountain View, CA (US); Stephen Matthew Meckler, Boulder, CO (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 686 days.

(21) Appl. No.: 17/889,507

(22) Filed: Aug. 17, 2022

(65) Prior Publication Data

US 2023/0080924 A1 Mar. 16, 2023

Related U.S. Application Data

(60) Provisional application No. 63/242,572, filed on Sep. 10, 2021.

(51) Int. Cl.
| | |
|---|---|
| *C02F 1/66* | (2023.01) |
| *C02F 1/46* | (2023.01) |
| *C02F 1/469* | (2023.01) |
| *C02F 1/58* | (2023.01) |
| *C02F 103/08* | (2006.01) |

(52) U.S. Cl.
CPC .............. *C02F 1/66* (2013.01); *C02F 1/4604* (2013.01); *C02F 1/469* (2013.01); *C02F 1/58* (2013.01); *C02F 2103/08* (2013.01); *C02F 2201/009* (2013.01); *C02F 2201/46145* (2013.01); *C02F 2201/46165* (2013.01); *C02F 2209/06* (2013.01)

(58) Field of Classification Search
CPC .. C02F 1/58; C02F 1/4604; C02F 1/66; C02F 1/469
See application file for complete search history.

(56) References Cited

U.S. PATENT DOCUMENTS

| | | | |
|---|---|---|---|
| 9,586,181 B2 | 3/2017 | Zhao et al. | |
| 10,550,014 B2 | 2/2020 | Desai et al. | |
| 10,821,395 B2 | 11/2020 | Beh et al. | |
| 11,932,560 B2 * | 3/2024 | Beh ...................... | C02F 1/46109 |
| 2007/0217982 A1 | 9/2007 | Wright et al. | |

(Continued)

OTHER PUBLICATIONS

U.S. Appl. No. 17/214,404, filed Mar. 26, 2021 for Electrochemical Device for Creation of PH Gradients, Inventors: Eugene S. Beh, Mahati Chintapalli, and Stephen Matthew Meckler.

(Continued)

*Primary Examiner* — Youngsul Jeong
(74) *Attorney, Agent, or Firm* — Mueting Raasch Group

(57) ABSTRACT

A system includes an aqueous salt solution feed stream having a first pH and an electrochemical device positioned proximate an aqueous restoration area. The electrochemical device may receive the feed stream and convert it the feed stream to an acid stream and a base stream having respective predetermined pH values. A first effluent stream comprises the base stream, wherein the first effluent stream has a second pH that is higher than the first pH. The first effluent stream is delivered proximate the aqueous restoration area. A second effluent stream comprises the acid stream, wherein the second effluent stream has a third pH that is lower than the second pH.

19 Claims, 5 Drawing Sheets

(56)        References Cited

U.S. PATENT DOCUMENTS

| | | | |
|---|---|---|---|
| 2012/0211421 A1 | 8/2012 | Self et al. | |
| 2013/0008792 A1* | 1/2013 | Eisaman | |
| 2013/0180400 A1* | 7/2013 | Iwamoto | B01D 53/62 |
| | | | 261/74 |
| 2021/0010143 A1* | 1/2021 | McDonnell | |
| 2021/0053871 A1* | 2/2021 | Novek | C01G 9/04 |
| 2021/0060484 A1 | 3/2021 | Aziz et al. | |

OTHER PUBLICATIONS

Esposito, "Membraneless Electrolyzers for Low-Cost Hydrogen Production in a Renewable Energy Future", Joule 1, Dec. 20, 2017, pp. 651-658.
Nam et al., "Electrochemical Desalination Using Bi/BiOCl Electrodialysis Cells", ACS Sustainable Chem. Eng., vol. 6, 2018, pp. 15455-15462.
European Patent Application No. 22194952.2, Office Action issued Jan. 25, 2023, 12 pages.

* cited by examiner

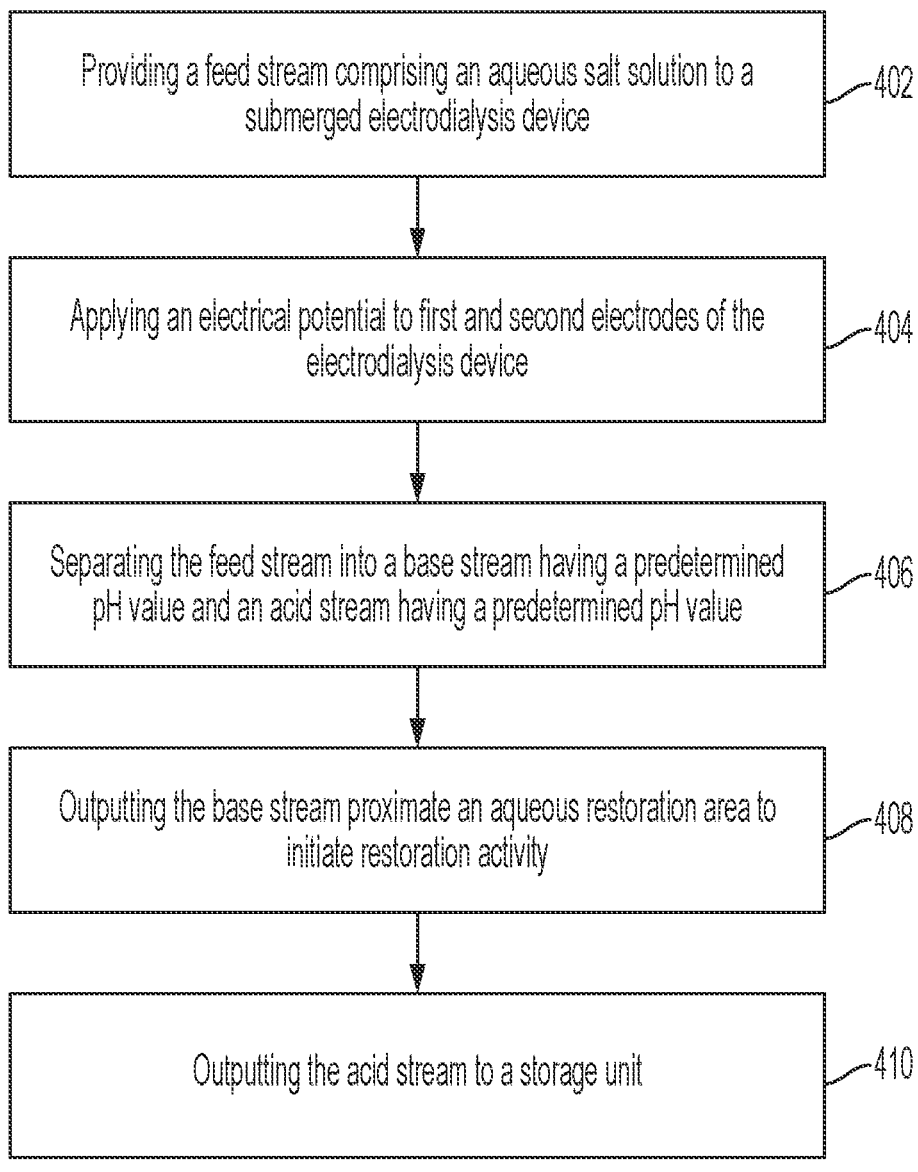

Providing a feed stream comprising an aqueous salt solution to a submerged electrodialysis device ~402

Applying an electrical potential to first and second electrodes of the electrodialysis device ~404

Separating the feed stream into a base stream having a predetermined pH value and an acid stream having a predetermined pH value ~406

Outputting the base stream proximate an aqueous restoration area to initiate restoration activity ~408

Outputting the acid stream to a storage unit ~410

FIG. 4

SYSTEM AND METHOD FOR MODIFYING pH IN AN AQUEOUS ENVIRONMENT

TECHNICAL FIELD

This disclosure relates generally to systems for modifying the pH of an aqueous environment, or a portion thereof, and methods of operating the same.

BACKGROUND

The world's oceans absorb carbon dioxide ($CO_2$) from the atmosphere as part of the carbon cycle. As atmospheric carbon dioxide levels have increased, so has the amount of $CO_2$ absorbed by the oceans. When carbon dioxide dissolves in seawater, it reacts to create carbonic acid. The carbonic acid in turn releases hydrogen ions (W), forming carbonate ($CO_3^{-2}$) and bicarbonate ($HCO_3^-$) ions. The pH of seawater, which determines the relative fractions of dissolved carbon dioxide, carbonate, and bicarbonate, is typically around 8.3. This means that the majority of dissolved total carbon in seawater is in the form of bicarbonate. Accumulation of these reactions over time has increased the acidity of the ocean's seawater, negatively affecting oceanic plant and animal life. For example, the rising acidity inhibits the growth of coral reef ecosystems.

Rebuilding coral reefs involves the formation of calcium carbonate for coral support. Whether calcium carbonate is formed naturally through coral growth or artificially, the formation also releases $CO_2$ into the environment when one unit of dissolved calcium bicarbonate is converted into one unit of calcium carbonate and one unit of carbonic acid, which can dissociate into water and $CO_2$. Raising the alkalinity of ocean water proximate a coral reef restoration or growth area can restore the area's natural pH and promote coral growth. Disclosed are embodiments directed to modifying the pH in aqueous environments, for example to promote coral growth, using electrochemical processes that are net carbon low, neutral, or negative.

SUMMARY

Certain embodiments are directed to a system. The system comprises an aqueous salt solution feed stream having a first pH and an electrochemical device positioned proximate an aqueous restoration area and configured to receive the feed stream. The electrochemical device is also configured to convert the feed stream to an acid stream and a base stream having respective predetermined pH values. A first effluent stream comprising the base stream is delivered proximate the aqueous restoration area. The first effluent stream has a second pH that is higher than the first pH. A second effluent stream comprises the acid stream, wherein the second effluent stream has a third pH that is lower than the second pH.

Other embodiments are directed to a method. The method includes flowing a feed stream of an aqueous salt solution having a first pH into an electrochemical device submerged in a body of water. An electrical potential is applied to first and second electrodes of the electrochemical device, and in response to applying the electrical potential, the feed stream is separated into an acid stream and a base stream having respective predetermined pH values. The base stream is output proximate an aqueous restoration area to increase water pH values proximate the aqueous restoration area and initiate restoration activity, and the acid stream is output to a storage unit.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

FIG. 4 is a flow diagram of a method in accordance with certain embodiments.

DETAILED DESCRIPTION

The ocean's ability to absorb $CO_2$ from the atmosphere results in the increasing acidity of the ocean's waters. One result from the increasing acidity is the inhibition, or destruction, of coral growth. Coral reefs have a minimum annual economic value of $375 billion through the sustenance of marine life as a source of food and tourism. This source of living is being disrupted by the rapid acidification of ocean water in which corals are unable to adapt quickly enough, leading to bleaching and eventual death.

Coral growth also releases $CO_2$ into the ocean. In contrast to initiating coral growth/restoration by distributing solid sodium hydroxide in the restoration area, embodiments described herein are directed to modifying the pH of the water (e.g., increasing the pH/alkalinity) proximate the restoration area with an aqueous base solution generated from water already present proximate the restoration area. While the embodiments discussed herein refer to ocean or seawater, the systems and methods described are applicable to water bodies of various salinities, including freshwater bodies. For example, a restoration area could include any area of aquaculture including fish farming or oyster cultivation. Thus, it should be understood that references to "water" include any amount of salinity from 0-100%.

Figure 1:
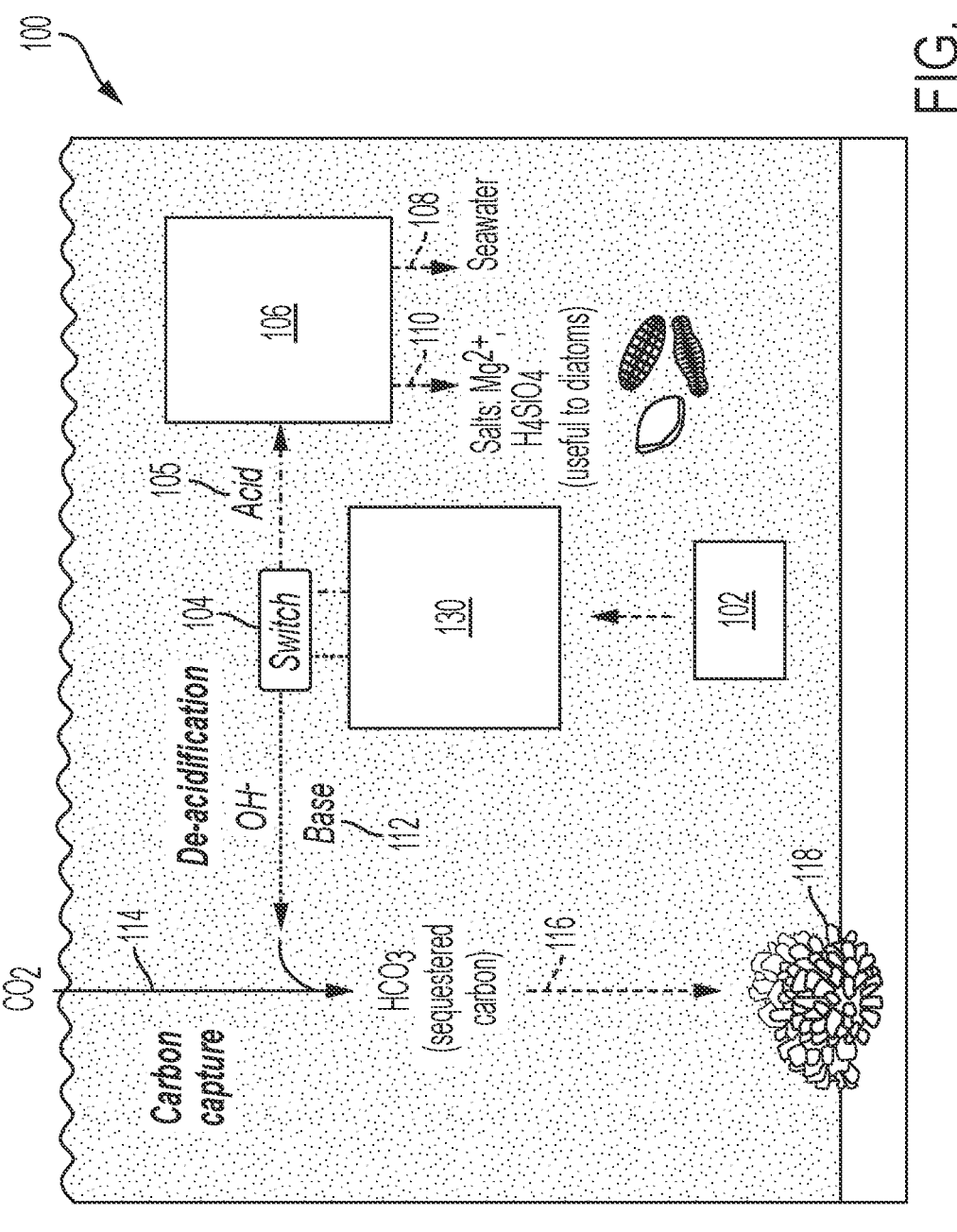
FIG. 1 is a block diagram of a system for modifying the pH of an aqueous environment in accordance with certain embodiments.

Turning to FIG. 1, a system 100 is illustrated that utilizes an electrochemical device 130 to convert an input feed stream 102 of seawater into an acid stream 105 and a base stream 112 for separate processing. When the input feed stream 102 is seawater, the feed stream may have a pH of about 8.1. The electrochemical device 130 may be a variety of types of devices, which are discussed in further detail below in connection with FIGS. 2A, 2B, and 3. However, the device is an electrolyzer that receives a slipstream of seawater 102 which flows through the device 130 and converts and separates the input feed stream 102 into an acid stream 105 and a base stream 112, each having a predetermined, controlled pH value. For example, coral growth is promoted when the pH of the aqueous environment is about 6.2-8.4 (depending upon the time of day, rates of photosynthesis, and the coral species). While a pH range of 6.2-8.4 is the end goal pH range for the environment proximate the restoration area, the device 130 may be modified to output a base stream having a pH in a range slightly above or below this range as the output base stream is designed to mix with existing water in the environment proximate the restoration area. As part of the control system, the device 130 may be coupled to a variety of sensors positioned internal or external to the device 130. For example, sensors may measure the pH of water proximate the input to the device 130, proximate the restoration area 118, and proximate the base stream 112 output. The same or additional sensors may also be configured to measure $CO_2$ capture efficiency proximate the device 130.

To control the pH of the output base stream, a pH value may be sensed proximate the aqueous restoration area 118, or at the output of the device 130. It is then determined whether the sensed pH exceeds a threshold. To "exceed a threshold" may refer to a sensed value being above or below one or more set pH values. For example, a sensed pH value may exceed a predetermined threshold by being lower (more acidic) than a desired pH for coral growth (e.g., a pH lower than 6.2). A sensed pH may also exceed a threshold if it outside a predetermined range—too high or too low with respect to the range endpoints. In response to a sensed pH exceeding a predetermined threshold, the electrochemical device 130 is controlled to modify the pH of the output base stream 112. Controlling the electrochemical device may involve modifying one or more of the electrical potential applied to the electrodes, the rate at which the feed stream is flowed through the electrochemical device, the rate at which at least one of the acid stream and the base stream is flowed through the electrochemical device, and diluting at least a portion of the base stream. In certain embodiments, the base stream produced by the electrochemical device 130 is further split into a diluted base stream and a concentrated base stream to further control the output pH of the device and the resulting local carbonate precipitation.

Since the output of the electrochemical device 130 is delivered proximate the aqueous restoration area 118, the electrochemical device 130 is also positioned proximate the restoration area 118. In certain embodiments, this means that the electrochemical device 130 is located within the body of water, i.e., the device 130 is submerged. Thus, the device is sealed and vented for underwater operation. The electrochemical device 130 is configured to operate underwater to a depth of at least 5 meters, or to a depth of at least 10 meters, or to a depth of at least 20 meters, or to a depth of at least 30 meters, or to a depth of at least 40 meters, or to a depth of at least 50 meters.

The device is located proximate the restoration area 118, the device may be powered by an off-grid power source such as solar energy/panels, wind energy/turbines, tidal energy, temperature gradient driven systems, and/or salinity gradient driven systems. In further embodiments, the system may be powered by a variety of other power sources including batteries and/or nuclear power. The power source may be remote or separate, but electrically connected to the electrochemical device 130. The power source may be on or above a surface of the body of water, but electrically connected to the electrochemical device 130 submerged beneath the surface of the body of water. The output streams of the electrochemical device 130 may be controlled by a switch 104.

The base stream 112 is output proximate a restoration area 118 (e.g., a coral reef where growth is desired). The base stream 112 may be directed on, over, or near the restoration area 118. However, the output base stream 112 is directly released into the body of water from which the input feed stream 102 was obtained. Thus, the output base stream 112 mixes with $CO_2$ or carbon 114 captured by the ocean to raise the pH/alkalinity (i.e., reduce the acidity) of the water proximate the restoration area, thereby permitting the corals to effectively precipitate the required amounts of calcium 116 from the ocean water to build their reefs. Base that diffuses through the ocean surface, increasing the local alkalinity, will also shift the chemical dissolved inorganic carbon (DIC) equilibrium to dissolve greater amounts of atmospheric $CO_2$ as calcium bicarbonate in the ocean— effectively lowering global atmospheric $CO_2$ levels. The method disclosed may be described as a carbon capture method. Thus, depending on the relative rates of base discharge into the ocean and coral growth, the process can have lower emissions than known means of calcium carbonate precipitation, including cases where the process is net carbon neutral or net carbon negative, or net carbon capture.

Since the acid stream 105 has a lower pH than the input feed stream 102, the acid stream 105 is collected in a storage unit 106. If the stored acid meets, or could meet with certain processing, required purity, composition, or other characteristics, the stored acid may be removed and transported for sale as a commodity. In alternative embodiments, the storage unit 106 may include one or more minerals or geological rock (e.g., carbonates and silicates) to induce accelerated weathering of the rock/minerals while neutralizing the acid to a from that can be safely discharged back into the ocean 108 without substantially lowering the seawater pH. For example, the storage unit 106 may be used to lower the pH of the acid back to the pH of the initial feed stream (e.g., 8.1). The weathering of the rocks is faster than both the time it would take to geologically weather them and the rate of weathering of ultrafine grains of the rocks dispersed on high-intensity shelves along the shore. The accelerated weathering releases silicates, carbonates, and/or bicarbonates back into the ocean water as well 110. The released silicates may be used by diatoms and the carbonates/bicarbonates may also be used by corals for reef building.

Bipolar membrane electrodialysis (BPMED) may be used to convert water or seawater into acids and bases without the addition of other chemicals. BPMED devices use ion exchange membranes to separate ionic species in solution when a voltage is applied across a stack of membranes.

Currently available BPMED apparatuses include an electrodialysis membrane stack made up of at least one electrodialysis cell. The electrodialysis cell includes at least one bipolar membrane (BPM) such that, when an electrical potential is applied across the cell, the dissociation of water into hydrogen ions (H+) and hydroxide ions (OH−) occurs.

A BPM is formed from a cation-exchange layer laminated together with an anion-exchange layer, as well as a junction layer between the cation and anion layers. Water diffuses into the junction layer, reaching the usual equilibrium with H+ and OH− ions according to its dissociation constant. Typically, a BPM is oriented such that the anion-exchange layer faces the anode (positive electrode) end of the BPMED apparatus and the cation-exchange layer faces the cathode (negative electrode) end of the apparatus. This orientation allows the OH− ions to be transported across the anion-exchange layer and the H+ anions to be transported across the cation-exchange layer when an electrical potential is applied across the membrane stack. Simultaneously, the constituent cations and anions of an input salt solution are separated under the applied electrical potential via ion exchange membranes, either anion exchange membranes (AEMs), cation exchange membranes (CEMs), or some combination of the two. The OH– (H+) ions "produced" by the BPM then combine with the cations (anions) separated from the input salt solution to produce basic (acidic) output solutions containing the parent acid and base of the input salt. Depending on the membrane configuration, for example, in a membrane stack composed of one or more "three-compartment" cells, a diluted salt solution or diluted seawater may also be produced as output in addition to the acid and base output solutions.

A BPMED membrane stack can have either a two-compartment or a three-compartment configuration. In a two-compartment configuration, adjacent membranes may alternate between BPM and AEM to form a membrane stack of the form BPM, AEM, BPM, AEM, etc.; or adjacent membranes may alternate between BPM and CEM to form a membrane stack of the form BPM, CEM, BPM, CEM, etc. In a three-compartment cell, adjacent membranes may cycle from BPM to AEM to CEM, forming a membrane stack of the form BPM, AEM, CEM, BPM, AEM, CEM, etc. Electrodialysis without bipolar membranes is also possible, and consists of a two-compartment configuration formed by an alternating series of AEM and CEM to form a membrane stack of the form AEM, CEM, AEM, CEM, AEM, etc. For any of these configurations, each of the end membranes at the two ends of the membrane stack may be an AEM, CEM, or BPM, depending on the configuration and process conditions. Exemplary embodiments of bipolar membrane electrodialysis devices are disclosed in U.S. Pat. No. 9,586,181 incorporated by reference herein.

Figure 2A:
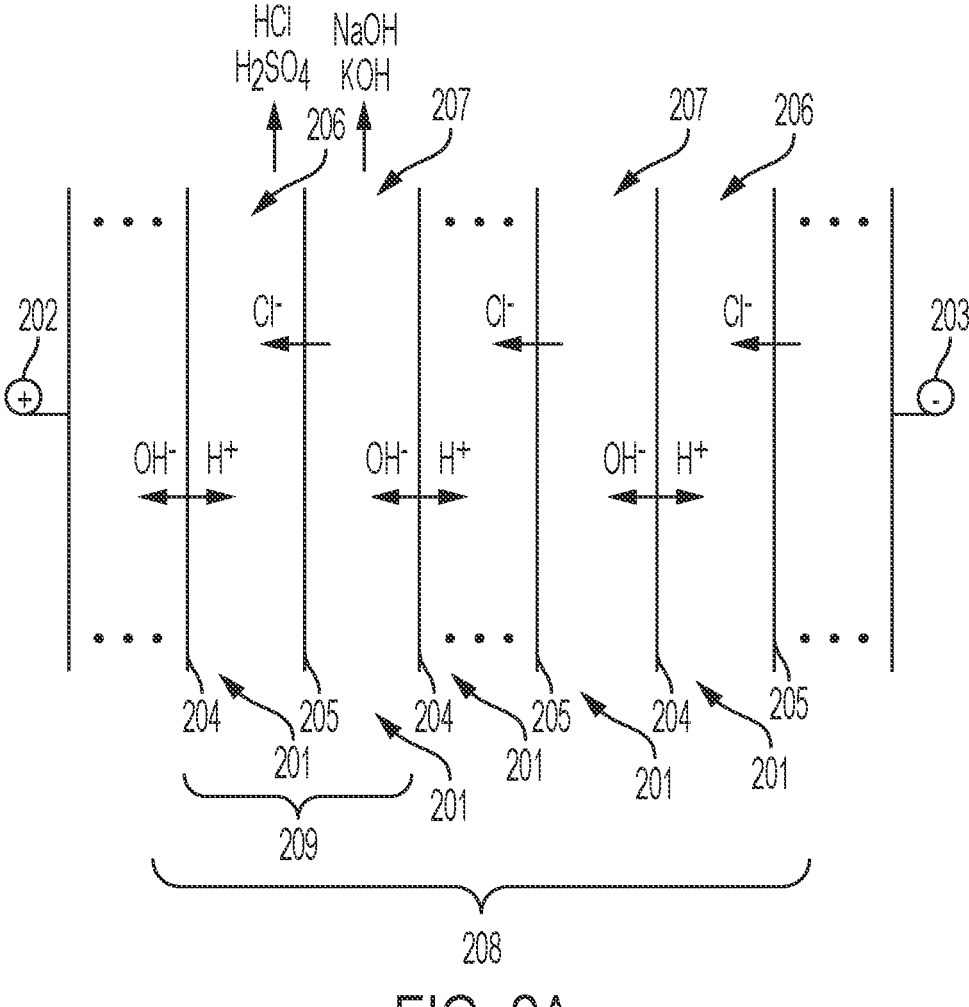
FIG. 2A is a schematic diagram of a bipolar membrane electrodialysis "two-compartment" membrane stack in accordance with certain embodiments.

FIG. 2A is a schematic of a bipolar membrane electrodialysis (BPMED) "two-compartment" membrane stack that may be used in certain embodiments as the electrochemical device 130 in system 100 above. A voltage is applied across an alternating stack of bipolar membranes (BPMs) 204 and anion exchange membranes (AEMs) 205. An acidified solution compartment 206 is formed between the BPMs 204 and their adjacent AEMs 205, and a basified solution compartment 207 is formed between the AEMs 205 and their adjacent BPMs 204. The number of acidified solution compartments 206 and basified solution compartments 207 in a given electrochemical stack 208 is a function of the number of electrochemical cells 209 in the stack 208. An electrochemical apparatus can be adapted to receive any number of electrochemical cells 209. The electrochemical stack 208 also includes two end membranes, one at either end of the BPMED stack 208 (not shown). Each of these end membranes may be a BPM, AEM, or a cation exchange membrane (CEM), depending on the membrane stack configuration and the process solutions and conditions used.

A single input feed solution 201 is flowed through all compartments 206 and 207 of the electrochemical stack 208. In certain embodiments, the feed solution 201 is an aqueous salt solution such as seawater. For example, the electrochemical device may be submerged in the ocean, and seawater may be input directly from the ocean and flowed into the electrochemical apparatus. An electrode solution, such as KOH or $H_2SO_4/Na_2SO_4$, is flowed into the two electrode compartments located at each end of the electrochemical stack 208 such that it flows across the electrodes 202 and 203 located at each end of the stack 208. Under the voltage applied at electrodes 202 and 203, the AEMs 205 permit negatively charged anions to pass across the membrane from the negative electrode 203 to the positive electrode 202. When using seawater, almost all of the ionic transport across the AEMs 205 is in the form of Cl-ions, since Cl-ions are in high proportion in seawater (approximately 546 mM). The BPMs 204 effectively dissociate water into $H^+$ and $OH^-$ ions under the applied voltage, with the $H^+$ ions transported from the BPMs 204 toward the negative electrode 203 and the $OH^-$ ions transported from the BPMs 204 toward the positive electrode 202. Thus, the feed solution 201 becomes acidified in the acidified solution compartments 206 because of the transport of the $H^+$ ions into the acidified solution compartments 206. The feed solution 201 also becomes basified in the basified solution compartments 207 because of the transport of the $OH^-$ ions into the basified solution compartments 207.

For each $Cl^-$ ion that is transported from the basified compartments 207 to the acidified compartments 206, a IV ion is transported from the middle of the adjacent BPM 204 into the acidified compartments 206, and a $OH^-$ ion is transported from the middle of the adjacent BPM 204 into the basified compartments 207. In this way, operation of the electrochemical apparatus decreases the pH of the acidified solution compartments 206 and increases the pH of the basified solution compartments 207. The change in pH from the input feed stream to the output base and acid streams depends on the composition of the input feed solution 201; the rate of ion transport, which is governed by the applied current and system efficiencies, the flow rate of the input feed solution 201 through the apparatus, and optional downstream dilution. Controlling one or more of these factors provides for the output base stream to have the predetermined pH to modify the aqueous environment proximate the output of the base stream.

Figure 2B:
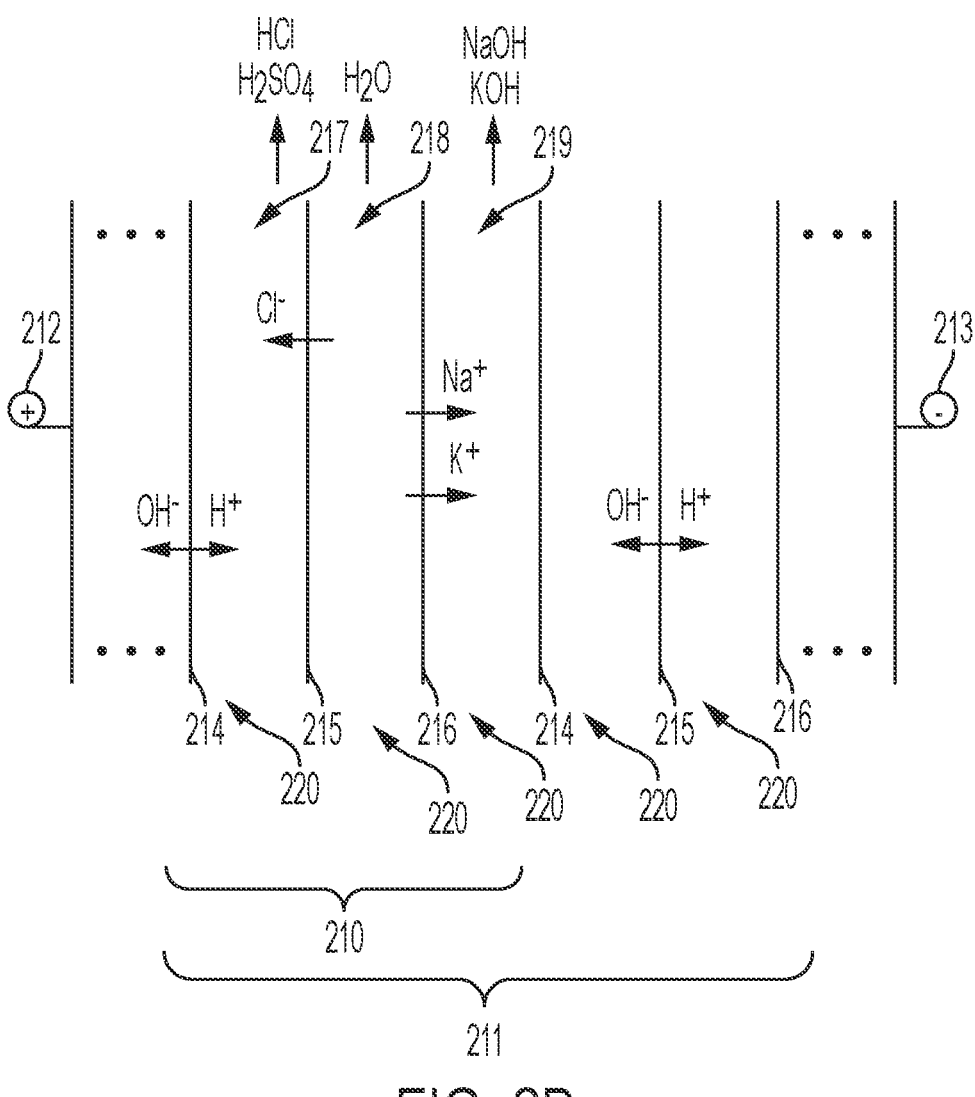
FIG. 2B is a schematic diagram of a bipolar membrane electrodialysis "three-compartment" membrane stack in accordance with certain embodiments.

In alternative embodiments, the electrochemical device 130 in system 100 may be a BPMED "three-compartment" membrane stack 211 as shown in FIG. 2B. A voltage is applied across an alternating stack of BPMs 214, AEMs 215, and CEMs 216. In the embodiment shown in FIG. 2B, the alternating BPMs 214, AEMs 215, and CEMs 216 form a "three-compartment" BPMED stack. An acidified solution compartment 217 is formed between the BPMs 214 and their adjacent AEMs 215; a basified solution compartment 219 is formed between the CEMs 216 and their adjacent BPMs 214; and desalinated solution is produced in the center compartment 218 between the AEM 215 and its adjacent CEM 216. Thus, the "three compartment" BPMED membrane stack 211 not only separates the input feed solution stream into acid and base streams, it also generates desalinated water. The degree to which the input feed solution 220 is desalted depends on the flow rate of the feed solution 220, the applied current density, and the efficiency of ion transport. In certain embodiments, the desalinated solution is returned to the body of water with the acid stream or as a separate output.

Similar to the two-compartment configuration of FIG. 2A, the number of acidified solution compartments 217, basified solution compartments 219, and center compartments 218 in a given BPMED stack 211 is a function of the number of cells 210 in the stack 211. A BPMED device can be adapted to receive any number of cells 210. The BPMED stack 211 also includes two end membranes, one at either end of the BPMED stack 211 (not shown). Each end membrane may be a BPM, AEM, or CEM, depending on the membrane stack configuration, input feed solution, and conditions.

When a voltage is applied at electrodes 212 and 213, the AEMs 215 permit negatively charged anions—mostly $Cl^-$ ions when the feed solution 220 is seawater—to pass across the membrane from the negative electrode 213 to the positive electrode 212. The BPMs 214 effectively dissociate water into $H^+$ and $OH^-$ ions under the applied voltage, with the $H^+$ ions transported from the BPMs 214 toward the negative electrode 213 and the $OH^-$ ions transported from the BPMs 214 toward the positive electrode 212. The CEMs 216 permit positively charged anions, such as $Na^+$ and $K^+$, to pass across the membrane from the positive electrode 212 to the negative electrode 213. Through this process, the input feed solution 220 becomes acidified in the acidified solution compartments 217 and basified in the basified solution compartments 219; and a desalinated solution is generated in the center compartments 218. Additional details for example BPMED devices (two or three compartment embodiments) can be found in U.S. Pat. No. 9,586,181, which is hereby incorporated by reference in its entirety. While bipolar membranes may be used to separate aqueous salt solutions into acidified and basified streams, other embodiments involving devices without membranes may also be used in the disclosed systems and methods.

Fluid flow control can be used to direct different portions of a fluid stream without using a physical barrier such as a membrane. For example, fluid flow may be controlled so as to prevent, or minimize, mixing between different portions of a fluid stream. This may be achieved by controlling the laminar flow of fluid and/or by directing different portions of a stream along predetermined directions. Controlling separate portions of a fluid stream (e.g., an aqueous stream) without mixing the two portions allows for separation, and capture, of materials in the fluid stream when combined with electrolysis. For example, a target component such as a molecule or solute in the fluid stream may be captured by acidifying a portion of the fluid stream to release the target molecule or solute.

Creation of a pH gradient in the fluid stream at two discrete electrodes rather than at a boundary within a bipolar membrane, and independently maintaining the separation of the acidified portion of the stream, i.e., absent a membrane or physical barrier, reduces the energy and costs required to perform and maintain the separation. Without a membrane, the electrochemical device, or cell, has fewer parts thereby reducing manufacturing costs. The lack of a membrane also allows for the electrochemical cell to be used with fluids (i.e., electrolytes) having a wider range of pH values which also allows for construction with a wider variety (e.g., less expensive) materials. For example, an electrochemical device with an input fluid stream (i.e., electrolyte) with an extremely high or low pH may avoid needing materials designed to resist corrosion. Moreover, removal of a membrane from an electrochemical separation cell removes issues related to durability, fouling, and resilience to components in the electrolyte. A membraneless system also opens up design paradigms where at least some of the components of the electrochemical cell are designed to be inexpensive and/or disposable, or otherwise replaceable at periodic or predetermined intervals. An exemplary membraneless electrochemical cell that generate a pH gradient is described below.

The term "membraneless electrochemical cell" as used herein refers to an electrochemical cell that does not include a membrane, or other non-porous or ion-selective barrier, positioned between the two electrodes. For example, in certain embodiments a membraneless electrochemical cell may include a mesh or porous separator interposed between the electrodes.

The electrodes of the electrochemical cell are coupled to an energy source that supplies a voltage to the first electrode through coupling and to the second electrode through coupling to apply an electrical potential across the electrodes.

When the electrical potential is applied across the electrodes, redox-active material of the first electrode undergoes a first proton-coupled faradaic reaction with the electrolyte (e.g., water), and the redox-active material of the second electrode undergoes a second proton-coupled faradaic reaction with the electrolyte (e.g., seawater), such that hydroxide ions are produced or hydronium ions are absorbed proximate the first electrode, and hydronium ions are produced or hydroxide ions are absorbed proximate the second electrode. In addition, the first and second redox-coupled reactions may also move ions (e.g., simultaneously) that are not hydroxide or hydronium ions, such as sodium ions or chloride ions. As a result, a first portion of the input stream proximate the first electrode has a different pH value than a second portion of the input stream proximate the second electrode, creating a pH gradient within the membraneless electrochemical cell. While the pH gradient is relative to the incoming pH of the feed stream, example gradient values may include a range of about 1 to 2 pH units, or about 2 to 4 pH units, or about 4 to 6 pH units. The pH gradient does not have to be centered around the incoming pH of the feed stream. For example, two output streams at a pH of 5 and a pH of 9 are possible with a feed stream having a pH of 8.

Figure 3:
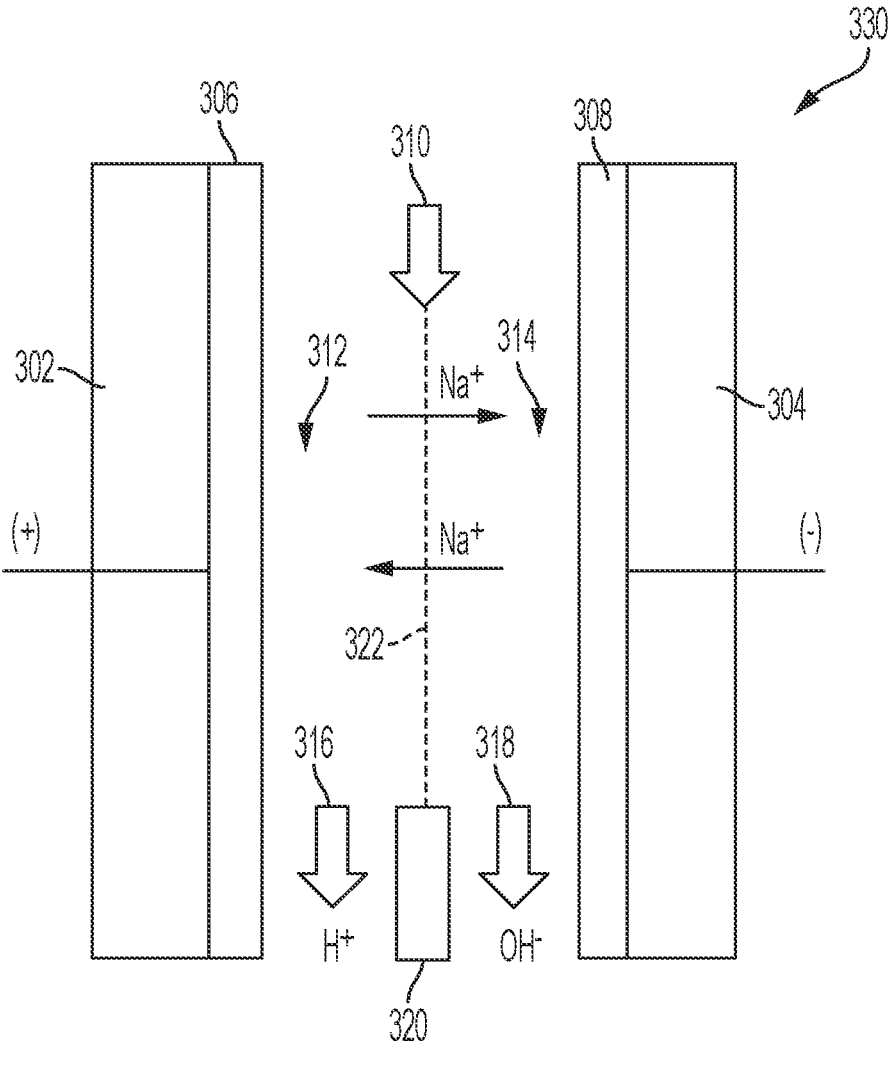
FIG. 3 is a schematic diagram of a laminar membraneless electrochemical cell in accordance with certain embodiments.

FIG. 3 illustrates certain embodiments of a membraneless electrochemical cell, referred to herein as a proton-coupled membraneless electrolyzer 330 or laminar membraneless electrolyzer 330. The proton-coupled membraneless electrolyzer 330 includes a laminar cell having a first electrode 302 comprising a first redox-active material 306 and a second electrode 304 comprising a second redox-active material 308 positioned opposite the first electrode. The first electrode 302 and the second electrode 304 may also be wholly constituted of the respective redox-active materials 306, 308. In this case 306, 308 should be understood as the electrodes for laminar membraneless electrolyzer 330. In certain embodiments, the first and second redox-active materials 306, 308 are materials that make up the same redox couple such as Bi/BiOCl or benzoquinone/hydroquinone. In other embodiments, the first and second redox-active materials 306, 308 may be the same or different. The redox-active material 306, 308 may also be at least one of a quinone, a phenazine, a pyrazine, a quinoxaline, or a derivative thereof. The redox-active material may also be at least one of an ionomer and a polymer, wherein the at least one of the ionomer and polymer comprises at least one of a quinone, a phenazine, a pyrazine, a quinoxaline, and a derivative thereof. The redox-active material 306, 308 is selected based on several factors including ease of production, relative abundance and availability, cost price, redox kinetics, oxygen stability in either redox state, water stability in either redox state, and chemical compatibility with the pH of the input stream 310 or any of the solutes dissolved therein.

In certain embodiments the redox-active material 306, 308 is coated onto the electrode 302, 304, as shown in FIG. 3. However, in alternative embodiments, the redox-active material 306, 308 is an organic molecule grafted onto and/or into the electrode, 302, 304. For example, one or both of the electrodes 302, 304 may comprise the redox-active material 306, 308 and at least one of a conductive material, a binder, and a conductive binder. The electrodes 302, 304 are positioned opposite each other with a gap between them. The gap is determined by one or more of the laminar flow characteristics of liquid inside the proton-coupled membraneless electrolyzer 330, the input and output flow rates, the electrode kinetics, and the presence or absence of an intervening porous separator 322. If an intervening porous separator 322 is present, it may be flat or have integrated flow channels. There may be pressure applied to the intervening porous separator 322 from an external compression to the proton-coupled membraneless electrolyzer 330, and the pressure directed through the first and second electrodes 302, 304. The electrodes 302, 304 themselves may also be flat or have integrated flow channels.

In a laminar membraneless electrolyzer 330, the input fluid stream, indicated by arrow 310, flows into the proton-coupled membraneless electrolyzer 330 substantially parallel to the first and second electrodes 302, 304 so that the input fluid stream 310 is in contact with major and opposing surfaces of each of the electrodes 302, 304 as shown in FIG. 3. Thus, the laminar flow of the input stream 310 may be considered as layers or portions flowing in the same direction indicated by arrow 310. For example, a first portion 312 or laminar flow may be proximate the first electrode 302 and a second portion 314 or laminar flow may be proximate the second electrode 304. When an electrical potential is applied across the electrodes 302, 304, the redox-active materials 306, 308 of the electrodes have proton-coupled faradaic reactions with the electrolyte proximate the electrodes 302, 304. For example, hydroxide ions are absorbed or hydronium ions are produced proximate the first electrode 302 thereby increasing the acidity of the first portion 312, and hydronium ions are absorbed or hydroxide ions are produced proximate the second electrode 304 thereby increasing the alkalinity of the second portion 314.

The laminar flow of both the first and second portions is controlled to minimize, or reduce, mixing between and maintain the acidic first portion 312 proximate the first electrode 302 and the alkaline second portion 314 proximate the second electrode 304 as the separate portions flow through the proton-coupled membraneless electrolyzer 330. For example, the flow may be controlled by one or more pumps positioned at the input or outputs of the laminar membraneless electrolyzer 330. Further, if present, integrated flow channels in one or both of the electrodes 302, 304 assist in directing the laminar flow of the first and second portions 312, 314 as well as increase the electrode surface area for the redox reactions.

As the first and second portions 312, 314 exit the laminar membraneless electrolyzer 330, they are separated by a physical barrier 320 (e.g., a nonpermeable wall) to maintain the separation of the different pH streams. As shown, the first effluent stream 316 has a lower pH and the second effluent stream 318 has a higher pH. The effluent streams may then be diverted as discussed above with respect to system 100. Additional details for example proton-coupled membraneless electrolyzers can be found in commonly-owned U.S. patent application incorporated by reference in its entirety. Regardless of whether the electrochemical separation device utilizes a membrane (e.g., FIGS. 2A-B) or is membraneless (e.g., FIG. 3), the pH of a water body, or a portion of a water body, can be modified as discussed further below.

FIG. 4 illustrates a method for modifying the pH of an aqueous environment using at least one of the acid/base separation devices discussed above. A feed stream comprising an aqueous salt solution is flowed or fed into an electrochemical device 402. As set forth above, the device may utilize two or more membranes, or it may be membraneless. To direct the output for the desired effect on the aqueous environment, the electrochemical device is positioned within a body of water (i.e., submerged) and proximate a restoration area. An electrical potential is applied across the first and second electrodes 404. For example, a first electrode is charged as the anode and a second electrode is charged as the cathode. In certain embodiments (e.g., when the device is a membraneless electrochemical cell), the potential applied across the electrodes is periodically reversed. Here, periodically may refer to either reversing the potential once in a while on an as-needed basis, or reversing the potential on a set schedule. The durations and the electrical potentials of the reversals do not have to be equal to those during forward, un-reversed, operation. As set forth above, the electrical potential may be provided by a renewable energy source, separate from the electrical grid, such as solar power, wind power, tidal power, and gradient-driven power.

In response to applying the electrical potential, the feed stream is separated into a base stream having a predetermined pH value and an acid stream having a predetermined pH value 406. The predetermined pH value is adjusted by modifying the current applied to the device and/or by modifying the flow rate of the input feed stream. For example, a pH value may be sensed proximate the restoration area and if the value exceeds a predetermined threshold, the electrochemical device is controlled to alter the predetermined pH value of the output base stream. The base stream is output proximate an aqueous restoration area to increase the pH of the aqueous environment proximate the restoration area and to initiate restoration activity 408. In certain embodiments the aqueous restoration area is a coral reef and the restoration activity is coral growth and the base stream is output on, above, and/or near the coral reef.

The acid stream is output to a storage unit 410. In certain embodiments the acid stream is stored and transported elsewhere to be sold as a commodity. In other embodiments, the acid stream is further processed for release back into the aqueous environment. For example, the storage unit may contain one or more carbonate-rich or silicate-rich minerals that react with the acid stream to increase the pH of the acid stream, e.g., to a level where the aqueous acid stream has a pH comparable, or equal, to the pH of the feed stream input to the electrochemical device. This modified acid stream may be released into the aqueous environment. The one or more minerals reacted with the acid stream may produce one or more of silicates, salts, carbonates, and bicarbonates. The silicates, salts, carbonates, and/or bicarbonates can be released into the aqueous environment with salts from the aqueous salt solution where the silicates may be used by diatoms in the ocean and the carbonates/bicarbonates may also be used by corals to grow reefs. In further embodiments, the minerals may react with the acid stream to extract carbon dioxide. Depending on the rates of base discharge proximate the restoration area and natural coral growth, the process for initiating restoration can have lower carbon dioxide emissions than traditional techniques for calcium carbonate precipitation such that the overall process is net carbon neutral or net carbon negative, or net carbon capture.

As set forth above, various embodiments directed to separating an aqueous salt solution feed stream into a base stream and an acid stream may be used to locally modify the pH of a body of water. In certain embodiments, this targeted pH modification may be used to initiate restoration of an aqueous environment such as the rebuilding of coral reefs. The electrochemical processes, in combination with the natural carbon capture of the body of water (e.g., oceans) may be net carbon low, neutral, or negative.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description has been presented for the purposes of illustration and description. It is not intended to be exhaustive or to limit the embodiments to the precise form disclosed. Many modifications and variations are possible in light of the above teachings. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. A system, comprising:
an aqueous salt solution feed stream having a first pH;
an electrochemical device positioned proximate an aqueous restoration area and configured to receive the aqueous salt solution feed stream and convert the aqueous salt solution feed stream to an acid stream and a base stream having respective predetermined pH values, wherein the electrochemical device is a bipolar membrane electrochemical device;
a first effluent stream comprising the base stream, wherein the first effluent stream has a second pH that is higher than the first pH and the first effluent stream is delivered proximate the aqueous restoration area without recombining with the acid stream prior to release;
a second effluent stream comprising the acid stream, wherein the second effluent stream has a third pH that is lower than the second pH and is directed to a storage unit containing one or more minerals that react with the acid stream to increase a pH of the acid stream before any discharge to a body of water; and
a controller coupled to a pH sensor proximate the aqueous restoration area and configured to adjust at least one of applied electrical potential and flow to maintain a local pH within a predetermined range.

2. The system of claim 1, wherein the electrochemical device is submerged in water.

3. The system of claim 1, further comprising a power source comprising at least one of solar power, wind power, tidal power, temperature gradient-driven systems, and salinity gradient driven-systems.

4. The system of claim 1, wherein the aqueous restoration area is a coral reef.

5. The system of claim 1, further comprising a first storage unit configured to receive the second effluent stream and store the acid stream for collection.

6. The system of claim 5, wherein the first storage unit comprises one or more minerals that react with the acid stream and increase a pH of the acid stream.

7. The system of claim 1, wherein the bipolar membrane electrochemical device comprises an alternating stack of bipolar membranes and ion-exchange membranes selected from anion-exchange membranes and cation-exchange membranes.

8. The system of claim 1, wherein the electrochemical device is configured to release the first effluent stream at a rate that results in a net carbon neutral or net carbon negative or net carbon capture process proximate the aqueous restoration area.

9. A method comprising:
flowing a feed stream of an aqueous salt solution having a first pH into an electrochemical device submerged in a body of water, wherein the electrochemical device is a bipolar membrane electrochemical device;
applying an electrical potential to first and second electrodes of the electrochemical device;
in response to applying the electrical potential, separating the feed stream into an acid stream and a base stream having respective predetermined pH values;
sensing a local pH with a pH sensor proximate an aqueous restoration area;
in response to the sensed local pH, adjusting at least one of applied electrical potential and flow to maintain the local pH within a predetermined range;
outputting the base stream proximate an aqueous restoration area without recombining with the acid stream prior to release to increase water pH values proximate the aqueous restoration area and initiate restoration activity; and
outputting the acid stream to a storage unit containing one or more minerals that react with the acid stream to increase a pH of the acid stream before any discharge to a body of water.

10. The method of claim 9, further comprising:
reacting the acid stream in the storage unit with one or more minerals to increase a pH of the acid stream to a second pH value and release one or more silicates, salts, carbonates, and bicarbonates; and
discharging the acid stream having the second pH value and containing the one or more silicates, salts, carbonates, and bicarbonates into the body of water.

11. The method of claim 9, further comprising:
removing the acid stream from the storage unit.

12. The method of claim 9, wherein the aqueous restoration area is a coral reef and outputting the base stream proximate the coral reef initiates growth of the coral reef.

13. The method of claim 9, further comprising:
sensing a pH value proximate the aqueous restoration area;
determining whether the sensed pH value exceeds a predetermined threshold; and
in response to the sensed pH value exceeding the predetermined threshold, controlling the electrochemical device to alter the base stream output predetermined pH value proximate the aqueous restoration area.

14. The method of claim 13, wherein controlling the electrochemical device comprises altering the electrical potential applied to the first and second electrodes.

15. The method of claim 13, wherein controlling the electrochemical device comprises altering a rate at which the feed stream is flowed through the electrochemical device.

16. The method of claim 13, wherein controlling the electrochemical device comprises altering a rate at which at least one of the acid stream and the base stream is flowed through the electrochemical device.

17. The method of claim 13, wherein controlling the electrochemical device comprises diluting at least a portion of the base stream.

18. The method of claim 9, wherein the electrical potential is supplied by at least one of solar power, wind power, and tidal power.

19. The method of claim 9, wherein a rate at which the base stream is output proximate the aqueous restoration area and a rate of restoration activity combine to result in a net carbon neutral or a net carbon negative, or a net carbon capture generation.

\* \* \* \* \*